United States Patent [19]

Fiorucci et al.

[11] Patent Number: 4,568,352
[45] Date of Patent: * Feb. 4, 1986

[54] ALKALI METAL NITRATE PURIFICATION

[75] Inventors: Louis C. Fiorucci, Hamden; Michael J. Morgan, Guilford, both of Conn.

[73] Assignee: Olin Corporation, Cheshire, Conn.

[ * ] Notice: The portion of the term of this patent subsequent to Dec. 20, 2000 has been disclaimed.

[21] Appl. No.: 613,667

[22] Filed: May 24, 1984

[51] Int. Cl.$^4$ ............................................. C01F 11/36
[52] U.S. Cl. .................................. 23/293 R; 23/304; 23/305 R; 23/305 F; 252/70; 252/71
[58] Field of Search ................. 423/55, 140, 144, 184, 423/194, 198, 395; 23/293 R, 304, 305 R, 305 F; 252/70, 71

[56] References Cited

U.S. PATENT DOCUMENTS

| | | | |
|---|---|---|---|
| 1,300,947 | 4/1919 | Freeth et al. | 423/194 |
| 1,357,973 | 11/1920 | Giesecke | 423/184 |
| 1,439,061 | 12/1922 | Broadbridge et al. | 423/184 |
| 1,915,428 | 6/1933 | Lambert | 423/194 |
| 2,040,548 | 5/1936 | Freed | 423/194 |
| 2,329,505 | 9/1943 | Zimmerman | 423/184 |
| 2,375,758 | 5/1945 | Bates | 252/71 |
| 2,375,759 | 5/1945 | Kalichevsky et al. | 252/71 |
| 4,421,662 | 12/1983 | Florucci et al. | 423/395 |

FOREIGN PATENT DOCUMENTS

| | | |
|---|---|---|
| 545590 | 6/1942 | United Kingdom . |
| 715470 | 2/1980 | U.S.S.R. ............... 423/395 |

OTHER PUBLICATIONS

Perry's Chemical Engineers' Handbook, Fourth Edition (1963), McGraw-Hill Book Co., Inc., pp. 17-10, 17-11.
Handbook of Chemistry and Physics, Forty-Third Edition (1961), Chemical Rubber Publishing Co., pp. 552, 553, 572, 573, 588, 589, 602, 603, 610, 611, 632, 633, 656, 657.
"Phase Relations in Heat Transfer Salt Systems", J. Alexander, Jr. et al., *Industrial and Engineering Chemistry*, vol. 39, No. 8, pp. 1044–1049.

*Primary Examiner*—John Doll
*Assistant Examiner*—Wayne A. Langel
*Attorney, Agent, or Firm*—Donald F. Clements; James B. Haglind

[57] ABSTRACT

A process is disclosed for removing contaminants from impure alkali metal nitrates containing them. The process comprises heating the impure alkali metal nitrates in solution form or molten form at a temperature and for a time sufficient to effect precipitation of solid impurities and separating the solid impurities from the resulting purified alkali metal nitrates. The resulting purified alkali metal nitrates in solution form may be heated to evaporate water therefrom to produce purified molten alkali metal nitrates suitable for use as a heat transfer medium. If desired, the purified molten form may be granulated and cooled to form discrete solid particles of purified alkali metal nitrates.

7 Claims, No Drawings

ALKALI METAL NITRATE PURIFICATION

The Government has rights in this invention pursuant to Contract No. Sandia 84-3878 awarded by the U.S. Department of Energy.

This invention relates to the purification of alkali metal nitrates. More particularly, it is directed to the removal of contaminants from a mixed alkali metal nitrate heat transfer medium.

A large number of investigations have been initiated to locate new energy sources since the beginning of the energy crisis. One technique presently under investigation is the use of solar energy to raise the temperature of a suitable heat transfer medium and convey the heat transfer medium to a suitable steam generator or to a heating system for an inhabited dwelling. One heat transfer medium under intensive investigation at this time is the eutectic mixture of sodium nitrate and potassium nitrate. This mixture may contain from about 30 to about 70 percent by weight of sodium nitrate and between about 30 and about 70 percent by weight of potassium nitrate, and preferably contains about 60% of sodium nitrate and about 40% of potassium nitrate by weight. This mixture has a relatively low melting point, which is about 400° F., (about 204° C.) and which has a relatively low viscosity in the molten state. As a result, it can be easily transferred by pumping or otherwise within a closed system.

Although sodium nitrate and potassium nitrate are relatively inexpensive chemicals, there are frequently small amounts of contaminants such as calcium, magnesium, iron and the like. When the molten form of the mixed nitrate is circulated in the solar power system, small quantities of impurities may be dissolved from the materials of construction used as conduits, storage tanks and the like. In addition, local hot spots in the solar energy system may cause degradation of the alkali metal nitrates to form oxides, oxygen and nitrogen. The oxides may react with water and carbon dioxide to form hydroxides and carbonates.

There is a need at the present time to provide a process for reducing the contaminants found in alkali metal nitrates, particularly those used in the preparation of solar energy heat transfer media and industrial process heat transfer systems.

It is a primary object of this invention to provide an improved process for purifying alkali metal nitrates.

It is another object of this invention to provide a process for reducing the concentration of impurities found in alkali metal nitrates.

Still another object of the invention is to provide a process for purifying mixed alkali metal nitrates utilized as a heat transfer medium in solar and industrial energy systems.

A further object of the invention is to provide a process for purifying eutectic mixtures of sodium nitrate and potassium nitrate.

These and other objects of the invention will be apparent from the following detailed description thereof.

It has now been discovered that the foregoing objects are accomplished in a process for removing contaminants from an impure alkali metal nitrate which comprises:

a. heating said impure alkali metal nitrate in liquid form at a temperature and for a time sufficient to effect a precipitation of solid impurities within said liquid alkali metal nitrate, and b. separating said solid impurities from the resulting purified liquid alkali metal nitrate.

More in detail, any alkali metal nitrate in liquid form containing impurities may be purified by the process of this invention. Typical examples of suitable alkali metal nitrates include sodium nitrate, potassium nitrate, lithium nitrate, and mixtures thereof. The process of this invention is particularly effective when treating a solar heat transfer medium comprised of a mixture of sodium nitrate and potassium nitrate, wherein the sodium nitrate concentration is about 60 percent by weight and the potassium nitrate concentration is about 40 percent by weight. However, the concentrations of sodium nitrate and potassium nitrate may range from about 30 to about 70 percent by weight of the mixture. The process of this invention is also useful for the purification of mixtures of sodium nitrate, potassium nitrate, and sodium nitrite used in industrial heat transfer loops of various chemical processes such as those used for the production of phthalic anhydride, maleic anhydride, caustic soda and the like.

The process of this invention may be utilized in the purification of alkali metal nitrates in aqueous solution or molten form. For example, solid sodium nitrate solids obtained by conventional mining and beneficiating techniques or those produced synthetically, which contain contaminants in the range of from about 0.03 to about 1.0 percent by weight, may be processed in accordance with the process of this invention. The solid particles of alkali metal nitrates or mixtures thereof may be heated to a temperature sufficient to provide a molten form which may also be purified by the process of this invention. Alternatively, the impure solid or molten alkali metal nitrates may also be dissolved in sufficient water to form an aqueous solution of the alkali metal nitrate having a concentration within the range of from between about 20 to about 80 and preferably between about 30 and about 75 percent of alkali metal nitrate by weight.

The aqueous solution of impure alkali metal nitrates prepared as described above is heated to a temperature in the range from about 20 to about 100, preferably from about 20° to about 85° C. to effect precipitation of impurities.

The molten form of impure aqueous nitrates are heated to a temperature in the range from about 240° to about 650° C. and preferably from about 250° to about 550° C. to effect precipitation of impurities.

The heating period utilized to achieve precipitation of the impurities from either the solution form or the molten form generally ranges from about 3 to about 30 and preferably from about 5 to about 20 minutes. However, longer or shorter time periods may be employed, if desired.

During the heating period impurities such as calcium, magnesium, iron, molybdenum and nickel in the form of oxides, nitrates, silicates and the like precipitate in the purified liquid alkali metal nitrates.

After the impurities have been precipitated, they are separated from the resulting purified liquid alkali metal nitrate by any conventional solid-liquid separation technique such as filtration, centrifuge, and the like. When the molten form of alkali metal nitrate is heated in accordance with the process of the invention, it is preferred to separate the precipitated impurities from the purified melt or solution utilizing a high pressure filter of the type described in U.S. Pat. No. 4,421,662, which issued Dec. 20, 1983.

If desired, the separated precipitate may be washed with water to remove any alkali metal nitrate values contained in the solid precipitate. The wash water containing dissolved nitrates may be used to dissolve impure alkali metal nitrate as described above.

The solid impurities are collected and may be discharged to a suitable waste area or landfill. The purified liquid alkali metal nitrate in aqueous solution form may be heated to evaporate water therefrom, if necessary, to form a molten form of the alkali metal nitrate. As indicated above, a eutectic mixture of sodium nitrate and potassium nitrate of the type used as a heat transfer medium in solar and industrial systems is effectively purified in accordance with the process of this invention.

When heating the liquid impure alkali metal nitrate as described above, suitable agitation means are employed. Mild agitation should be used in order to prevent breaking up the precipitate into finely divided particles, since the finely divided particles generally are more difficult to separate by filtration or centrifuging than the coarse floc-type precipitates obtained with mild agitation.

Impurities separated from the liquid alkali metal nitrate as solid precipitate in accordance with the process of this invention, include metals such as calcium, magnesium, nickel, molybdenum, iron and copper. These compounds may be in the form of nitrates, nitrites, carbonates, hydroxides, silicates and oxides. Effecting precipitation by the process of this invention reduces impurities to the desired level without adding any foreign substances to the solution. Many of the impurities are obtained by dissolving impurities into the molten form of the alkali metal nitrate when contacted with materials of construction used in the solar or industrial energy systems. The process of this invention provides a means to control the concentration of these impurities effectively. Purification of a bleed stream from the solar or industrial energy system or the individual components of the heat transfer medium can be accomplished with the process of this invention without the need to close down the plant during operation.

In another embodiment of the invention, sodium carbonate or another alkali metal carbonate may be added to the molten form prior to heating in order to enhance precipitation of the impurities as the metal carbonate. At least the stoichiometric, and preferably from about 1.5 to about 2.0 times the stoichiometric quantity needed to form carbonates with metal impurities, is employed.

The following examples are presented in order to define the invention more fully without any intention of limiting the invention. All parts and percentages are by weight unless otherwise specified.

EXAMPLE 1

25 Grams of a mixture of sodium nitrate and potassium nitrate (60:40) containing about 165 parts per million of calcium and about 165 parts per million of magnesium were dissolved in 15 ml of distilled water at room temperature. The finely divided precipitate was removed by filtration. The filtrate contained less than 15 ppm of calcium and 5.75 ppm of magnesium (24 ppm Ca and 9 ppm Mg on a dry basis).

EXAMPLE 2

100 Grams of a mixture of sodium nitrate and potassium nitrate (60:40) in solid form containing about 189 parts per million of calcium and about 142.5 parts per million of magnesium were placed in a quartz tube and heated to about 260° C. for about 8 minutes. The melt was then cooled to about 230° C. and filtered on a 10 micron stainless steel disc filter. The tan precipitate contained about 1.74% calcium and about 1.42% magnesium. The filtrate contained less than about 15 parts per million of calcium and less than about 0.5 parts per million of magnesium on a dry basis.

EXAMPLE 3

The procedure of EXAMPLE 2 was repeated except that the solids were heated to a temperature of about 550° C. for about 8 minutes and then cooled to about 300° C. before filtration. The filter cake showed a calcium level of about 3.54% and a magnesium level of about 2.57% by weight. The filtrate contained less than about 15 parts per million of calcium and about 0.58 parts per million of magnesium.

EXAMPLES 4-7

A purification system was constructed which was comprised of an agitated vessel having a capacity of 90 gallons, appropriate heating means for the vessel, pumping and piping means to convey the heated contents of the vessel to a high pressure sintered metal filter having a 2 micron pore size. The agitated vessel was provided with a recycle piping system for agitating the vessel contents.

In each example, 45 gallons (350 lbs.) of water were placed in the agitated vessel and heated to about 66° C. 350 Pounds of a mixture of sodium nitrate and potassium nitrate (60:40) were added to the vessel while recycling the heated water contents. The resulting aqueous solution of mixed nitrates was recycled and agitated for about 15 minutes. A portion of the agitated solution was then conveyed to the high pressure filter until a pressure of about 30 pounds per square inch was developed across the filter. Filtration of the aqueous solution was ended and the contents of the high pressure filter having both liquids and solids were collected and analyzed. The analysis of the initial aqueous solution of mixed nitrates, the filter cake, and clarified filtrate are presented below in the Table as EXAMPLE 4. Procedure was repeated and the results are presented below in Table 1 as EXAMPLE 5.

The procedure was further repeated in EXAMPLES 6-7 except that no water was added to the vessel and the molten contents was admixed at a temperature of 240° C. for 15 mins. prior to filtration. Analysis of the initial melt, the clarified filtrate and the filter cake are presented below in Table 1.

TABLE 1

| | | ANALYSIS OF INITIAL SOLUTION, FINAL FILTRATE AND FILTER CAKE | | | | | | |
|---|---|---|---|---|---|---|---|---|
| Run | Sample | Sodium (%) | Potassium (%) | Nickel (ppm) | aluminum (ppm) | Magnesium (ppm) | Iron (ppm) | Calcium (ppm) |
| Ex.4 | Initial | 43.64 | 56.36 | 2.5 | <1 | 56.25 | 25 | 50 |
| | Final | 47.75 | 52.25 | 2.5 | <1 | 55 | 25 | 50 |
| | Filter | 47.75 | 52.25 | 5 | 15 | 100 | 50 | 62.5 |
| Ex. 5 | Initial | 53.84 | 46.16 | 4.5 | 5 | 56.25 | 25 | 37.5 |
| | Final | 53.38 | 46.62 | 4.5 | 5 | 55 | 25 | 25 |

TABLE 1-continued

| | | ANALYSIS OF INITIAL SOLUTION, FINAL FILTRATE AND FILTER CAKE | | | | | | |
|---|---|---|---|---|---|---|---|---|
| Run | Sample | Sodium (%) | Potassium (%) | Nickel (ppm) | aluminum (ppm) | Magnesium (ppm) | Iron (ppm) | Calcium (ppm) |
| | Filter | 51.37 | 48.63 | 5 | 10 | 80 | 37.5 | 37.5 |
| Ex. 6 | Initial | 61.64 | 38.36 | 4.5 | 10 | 58.13 | 12.5 | 25 |
| | Final | 62.16 | 37.84 | 4 | 10 | 56.25 | 12.5 | 25 |
| | Filter | 62.16 | 37.84 | 6 | 10 | 98.75 | 25 | 37.5 |
| Ex. 7 | Initial | 62.76 | 37.24 | 4.5 | 5 | 27.5 | 12.5 | 37.5 |
| | Final | 62.6 | 37.4 | 4 | 5 | 36.25 | 12.5 | 37.5 |
| | Filter | 61.55 | 38.45 | 5.5 | 10 | 65 | 25 | 100 |

These analyses show that because of the large volume of liquor analyzed, there was little detectable change in the elemental analysis of the initial feed and the final filtrate. However, filter cake analysis of the elements shows a significant collection of impurities. In the calcium analysis in Example 5, there appears to be a discrepancy due to the low concentration of calcium present and the ability of the analytical technique to detect calcium at such low levels in the filtrate and the filter cake.

A material balance and other operating conditions of the examples are set forth below in Table 2.

TABLE 2

| | MATERIAL BALANCE AND OPERATING CONDITIONS | | | | | |
|---|---|---|---|---|---|---|
| Example | Time[1] (min.) | B.D.[2] (Lb.) | F.R.[3] (Gal/Min) | Solids-IN[4] (Grams/250 ml) | Solids-FIL[5] (Grams/250 ml) | Solids-FN[6] (Grams/250 ml) |
| 4 | 8 | 42 | 1.0 | .2203 | .1711 | .0265 |
| 5 | 7 | 31 | .7 | .0259 | .0845 | .0515 |
| 6 | 17 | 46 | .6 | .0218 | .0343 | .0215 |
| 7 | 21 | 48 | .6 | .0115 | .0537 | .0156 |

[1]Time to reach 30 lbs./sq. inch pressure drop across filter
[2]BD = Blowdown is the contents of the pressure filter at the point where the pressure drop reached 30 lbs. per square inch
[3]F.R. = Flow Rate
[4]Solids-IN = Initial Solids
[5]Solids-FIL = Filter Solids
[6]Solids-FN = Final Solids Material balances set forth in Table 2 are based upon a summation of elemental components in the various feed streams. Because of the minute quantities of these elements present in such a large volume of slurry (nearly 90 gallons), it was extremely difficult to obtain meaningful material balances.

Listed below in Table 3 are the results of Semi-Quantitative Spectrographic Analysis of the solid filter cakes of Examples 5, 6 and 7.

TABLE 3

| Semi-Quantitative Spectrographic Analysis Example 5 | | |
|---|---|---|
| Component | Range, % | Elemental Analysis |
| Principal | 100–10 | Si |
| Major | 10–1 | Mg, Fe, Al |
| Strong | 1–.1 | Cr, Ni, Ti |
| Medium | .1–.01 | B, Mn, Mo, Ca, Cu, Zn, Pb, Na |
| Weak | .01–.001 | Sn, V, Co |
| Trace | .001–.0001 | Ba, Ga |
| Faint Trace | <.0001 | Ag |
| Not detected at levels indicated: | | |
| | <.1 | Hg |
| | <.01 | As, Te, P, Tl, Li, Cd, Sr |
| | <.001 | Sb, In, Bi, Nb, Zr |
| | <.0001 | Be, Ge |

TABLE 4

| Semi-Quantitative Spectrographic Analysis Example 6 | | |
|---|---|---|
| Component | Range, % | Elemental Analysis |
| Principal | 100–10 | Si |
| Major | 10–1 | Mg, Fe, Al |
| Strong | 1–.1 | Ni, Ca, Na, Ti |
| Medium | .1–.01 | B, Mn, Pb, Mo, Cu, Zn |
| Weak | .01–.001 | V, Co |
| Trace | .001–.0001 | Sn, Ga |
| Faint Trace | <.0001 | Ag |
| Not detected at levels indicated: | | |
| | <.1 | Hg |
| | <.01 | As, Te, P, Tl, Li, Cd, Sr |
| | <.001 | Ba, Sb, In, Bi, Nb, Zr |
| | <.0001 | Be, Ge |

TABLE 5

| Semi-Quantitative Spectrographic Analysis Example 7 | | |
|---|---|---|
| Component | Range, % | Elemental Analysis |
| Principal | 100–10 | Si |
| Major | 10–1 | Mg, Fe, Al, Na |
| Strong | 1–.1 | Cr, Ni, Ca, Ti |
| Medium | .1–.01 | B, Mn, Pb, Mo, V, Cu, Zn, Co, Zr |
| Weak | .01–.001 | Ga |
| Trace | .001–.0001 | Ba, Sn |
| Faint Trace | <.0001 | Ag |
| Not detected at levels indicated: | | |
| | <.1 | Hg |
| | <.01 | As, Te, P, Tl, Li, Cd, Sr |
| | <.001 | Sb, In, Bi, Nb |
| | <.0001 | Ge, Be |

What is claimed is:

1. The process for removing impurities from an impure molten alkali metal nitrate containing impurities selected from the group consisting of oxides, nitrates, and silicates of calcium, magnesium, iron, molybdenum, and nickel, said impure molten alkali metal nitrate being comprised of a mixture of between about 30 percent and about 70 percent by weight of sodium nitrate and between about 30 percent and about 70 percent by weight of potassium nitrate, wherein said process comprises:
a. heating said impure molten metal nitrate at a temperature and for a time sufficient to precipitate said impurities within said molten alkali metal nitrate; and
b. separating said solid impurities from the resulting purified molten alkali metal nitrate.

2. The process of claim 1 wherein said mixture contains about 60 percent sodium nitrate and 40 percent potassium nitrate.

3. The process of claim 1 wherein said mixture is heated from about 3 to about 30 minutes.

4. The process of claim 1 wherein said mixture is heated from about 5 to about 20 minutes.

5. The process of claim 3 wherein said purified molten alkali metal nitrate is granulated and cooled to form discrete solid particles of said alkali metal nitrate.

6. The process of claim 3 wherein said molten form is heated at a temperature in the range between about 240° and about 650° C.

7. The process of claim 3 wherein said temperature is in the range between about 250° and about 550° C.

* * * * *